(12) United States Patent
Nielsen et al.

(10) Patent No.: US 10,443,933 B2
(45) Date of Patent: Oct. 15, 2019

(54) METHOD FOR CLEANING A NOZZLE ARRANGEMENT IN A SPRAY DRYING APPARATUS, AND SPRAY DRYING APPARATUS FOR CARRYING OUT THE METHOD

(71) Applicant: GEA Process Engineering A/S, Søborg (DK)

(72) Inventors: Jens Ulrik Nielsen, Søborg (DK); Thomas Filholm, Hellerup (DK); Troels O. J. P. Berg, Copenhagen NV (DK); Thomas Willum Jensen, Værløse (DK)

(73) Assignee: GEA Process Engineering A/S, Søborg (DK)

( * ) Notice: Subject to any disclaimer, the term of this patent is extended or adjusted under 35 U.S.C. 154(b) by 653 days.

(21) Appl. No.: 15/030,056

(22) PCT Filed: Oct. 18, 2013

(86) PCT No.: PCT/DK2013/050336
§ 371 (c)(1),
(2) Date: Apr. 16, 2016

(87) PCT Pub. No.: WO2015/055204
PCT Pub. Date: Apr. 23, 2015

(65) Prior Publication Data
US 2016/0252299 A1    Sep. 1, 2016

(51) Int. Cl.
*F26B 3/12* (2006.01)
*B01D 1/18* (2006.01)
*B08B 9/027* (2006.01)
*B05B 15/555* (2018.01)
*B05B 15/52* (2018.01)

(52) U.S. Cl.
CPC ................ *F26B 3/12* (2013.01); *B01D 1/18* (2013.01); *B05B 15/52* (2018.02); *B05B 15/555* (2018.02); *B08B 9/027* (2013.01)

(58) Field of Classification Search
None
See application file for complete search history.

(56) References Cited

U.S. PATENT DOCUMENTS 6,258,164 B1    7/2001    Nieminen

FOREIGN PATENT DOCUMENTS

| CN | 1248499 A | 3/2000 |
|---|---|---|
| CN | 102288015 A | 12/2011 |
| CN | 202666435 U | 1/2013 |

(Continued)

*Primary Examiner* — Eric W Golightly
(74) *Attorney, Agent, or Firm* — Condo Roccia Koptiw LLP

(57) ABSTRACT

In a spray drying apparatus, comprising in a usual manner a drying chamber, an air disperser, and at least one pressure nozzle arrangement (4), means are provided for emptying the feed in the nozzle arrangement(s) (4) after the supply of feed from a feed system (5) is halted and before the nozzle arrangement(s) (4) are removed from the drying chamber and positioned in a cleaning system (7). The emptying takes place while maintaining atomization in the nozzle arrangement (4). The feed emptying system (6) comprises a pump (60), a pressurized air/gas source (61) and a conduit (62), and the spray drying apparatus at least one valve (45, 53, 63, 64, 65, 66) allowing switching from the feed system (5) to the feed emptying system (6).

11 Claims, 4 Drawing Sheets

(56) References Cited

FOREIGN PATENT DOCUMENTS

| | | |
|---|---|---|
| CN | 203183712 U | 9/2013 |
| CN | 103338849 A | 10/2013 |
| EP | 0913205 A2 | 5/1999 |
| JP | 53-37964 U | 4/1978 |
| JP | 7-25901 A | 1/1995 |
| JP | 08-299701 A | 11/1996 |
| JP | 11-128796 A | 5/1999 |
| JP | 2001-000162 A | 1/2001 |
| JP | 2002-038046 A | 2/2002 |
| JP | 2004-174481 A | 6/2004 |
| JP | 2006-000769 A | 1/2006 |
| JP | 2012-024682 A | 2/2012 |
| KR | 10-1997-0009899 A | 3/1997 |
| KR | 10-2011-0101449 A | 9/2011 |
| WO | WO 1993/023129 A1 | 11/1993 |
| WO | WO 1997/014288 A2 | 4/1997 |
| WO | WO 2011/028105 A2 | 3/2011 |
| WO | WO 2011/063808 A1 | 6/2011 |
| WO | WO 2012/032078 A1 | 3/2012 |
| WO | WO 2012/058575 A2 | 5/2012 |

METHOD FOR CLEANING A NOZZLE ARRANGEMENT IN A SPRAY DRYING APPARATUS, AND SPRAY DRYING APPARATUS FOR CARRYING OUT THE METHOD

CROSS REFERENCE TO RELATED APPLICATIONS

This application is the National Stage Entry under 35 U.S.C. § 371 of Patent Cooperation Treaty Application No. PCT/DK2013/050336, filed Oct. 18, 2013 the contents of which are hereby incorporated by reference herein.

FIELD OF THE INVENTION

The present invention relates to a method for cleaning a pressure nozzle arrangement of a spray drying apparatus during operation, comprising the steps of: providing a spray drying apparatus with a drying chamber, providing at least one pressure nozzle arrangement inserted into the drying chamber and having a feed inlet and a feed outlet, providing a feed conduit for supplying liquid feed to a the feed inlet of each nozzle arrangement at a predefined pressure for atomization of the liquid feed, providing a system for cleaning of at least one nozzle arrangement, halting the feed supply for the nozzle arrangement(s) to be cleaned during operation, removing the at least one nozzle arrangement from the drying chamber, and cleaning the nozzle arrangement in the cleaning system. The invention furthermore relates to a spray drying apparatus.

BACKGROUND OF THE INVENTION

In such a spray drying apparatus, a liquid product is turned into a powder product by contacting an atomized liquid feed with drying air or gas. The drying takes place in a drying chamber, in which the drying air is brought into contact with the atomized feed, and the atomization takes place by one or more nozzles or other forms of atomizer, such as a rotary atomizer. The drying air enters the drying chamber via an air disperser positioned at or near the top of the drying chamber. Further drying means may be provided in such a drying system, for instance a fluidized bed. One and the same spray drying apparatus may be utilized either for drying the same, or a number of different liquid feeds.

The parts of the spray drying apparatus needs to be cleaned at regular intervals, for instance following a predefined cleaning schedule. The regular cleaning is necessary in order to meet the requirements set by governmental regulations and/or manufacture specifications. Such cleaning is carried out at suitable intervals to avoid product degradation, contamination and build-up of deposits in the components. The cleaning normally takes place by means of so-called Cleaning-In-Place (CIP) systems, in order to keep the time needed for cleaning as short as possible with disassembly of as few components as possible. The cleaning fluid may be water or possibly an alternating use of water and suitable detergents or cleaning agents. For some purposes, CIP may be used in combination with a further sterilization process. After CIP, drying out of the systems takes place.

The interior of components such as the drying chamber and other units forming part of a spray drying plant such as cyclones, bag filters, fluid bed chambers, process chambers, containers, tanks, ducts or any similar vessel are cleaned by cleaning nozzles distributing the cleaning fluid into the chamber or vessel itself. In spray drying apparatus utilizing nozzles for atomization of the liquid, the nozzles are removed from the drying chamber for cleaning and placed in CIP stands on top of the drying chamber in order to clean the nozzles, nozzle lances and the upstream feed tubes. Cleaning of the entire spray drying apparatus is normally carried out at standstill, but parts of the apparatus are CIP-cleaned also during operation.

The atomizer nozzles mainly comprise two categories, viz. pressure nozzles and two-fluid nozzles. Many other types of nozzles also exist, including combinations of the above mentioned types. In pressure nozzles, the liquid feed is supplied at high pressure, whereas two-fluid nozzle atomization is achieved pneumatically by high-velocity compressed air/gas impacting the liquid feed. Two-fluid nozzles are suitable for products where flow properties cause sharp increases in viscosity with shear. Such products are normally not suitable for atomization in pressure nozzles, but are successfully handled in two-fluid nozzles, where atomization is achieved by application of very low shear stresses. The kinetic energy for atomization in two-fluid nozzles is supplied by compressed air, and hence, the application of two-fluid nozzles is limited due to the costs of producing the compressed air.

Now dealing with pressure nozzles, during cleaning, for instance as a step in a cleaning schedule, the nozzles, possibly attached to respective nozzle lances, are removed from the drying chamber, typically in groups of for instance 4 to 12 nozzles, and placed in the CIP stands on top of the drying chamber. Before removing a group of nozzles, i.e. a subset of the total number of nozzles in operation, the supply of liquid feed hereto is stopped, for instance by switching supply valves for the feed, and the nozzles, nozzle lances and upstream feed supply tubing are flushed with purge air or gas to empty these. Following the cleaning procedure, the nozzles are reinserted into the drying chamber, and the supply of feed is initiated again, typically all controlled by a control system. This routine is then performed for another subset of nozzles. Such a change-over process of a group of nozzles typically takes up to 30 minutes, depending on the spray dryer size, type and the feed involved. Cleaning of a group of nozzles may e.g. typically be determined by and connected to an upstream cleaning of a related evaporator and/or other feed-processing equipment.

Although such change-over and cleaning procedures function very satisfactory, it has turned out that over time, formation and build-up of deposits on parts of the spray drying apparatus, in particular on the side and top walls inside the drying chamber, are unavoidable. As such deposits are detrimental from a number of points of views, in particular as regards cleaning, product quality, capacity, and even overheating.

Thus, several attempts have been made to reduce the formation of deposits, one example being shown in Applicant's international publication WO 93/23129 A1 (the commercial product being traded under the name JET SWEEP™), and to survey operation to detect deposits, for instance as shown in Applicant's international publication WO 2011/063808 A1 in which monitoring of the spray dryer is carried out by the means of infrared cameras during operation.

However, while the above publications provide several advantages, the issue of avoiding or reducing deposits remains crucial.

Also, pressure nozzles with an integrated valve is known, but for the above mentioned purpose have a row of disadvantages making these a non-option for many purposes in food or pharmaceutical spray drying processes. Such disadvantages are e.g. reliability as to function and tightness, CIP-possibilities, and the danger of emitting pieces from wear-parts into the product.

SUMMARY OF THE INVENTION

On this background, it is an object of the present invention to provide a method of the kind mentioned in the introduction, by which the risk of the formation of deposits is reduced.

In a first aspect, this and further objects are met by a method for cleaning a pressure nozzle arrangement of a spray drying apparatus during operation, comprising the steps of:

providing a spray drying apparatus with a drying chamber, providing at least one pressure nozzle arrangement inserted into the drying chamber and having a feed inlet and a feed outlet, providing a feed conduit for supplying liquid feed to the feed inlet of each nozzle arrangement at a predefined pressure for atomization of the liquid feed, providing a system for cleaning of the at least one nozzle arrangement, halting the feed supply for the nozzle arrangement(s) to be cleaned during operation, removing the nozzle arrangement(s) from the drying chamber during operation, cleaning the nozzle arrangement(s) in the cleaning system, wherein after the feed supply is halted and before the nozzle arrangement(s) is/are removed from the drying chamber, the nozzle arrangement(s) is/are emptied for feed by a method step selected from i) supplying a liquid at substantially the same pressure as the predefined pressure of the feed supply to the feed inlet of the nozzle arrangement, ii) supplying pressurized air or gas at a pressure of at least 16 bar to the feed inlet of the nozzle arrangement, iii) applying a suction from the feed inlet of the nozzle arrangement, and iv) applying an additional stream of pressurized air or gas concentrically of the feed outlet of the nozzle arrangement.

By the provision of such a method step of emptying the feed, it is ensured that the feed remaining in the nozzle arrangement and upstream equipment after halting the feed supply is atomized as well. Without wishing to be bound by theory, the principle underlying the invention is based on the recognition that the feed entering the drying chamber following the halting of the feed supply of a nozzle is one source of deposits on the interior surfaces of the spray drying chamber. In prior art methods insufficient atomization occurs during such change-over. As all of the feed entering the drying chamber is properly atomized with the method according to the invention, the risk of deposits of feed on the walls is eliminated or at least reduced to a substantial extent.

In the method, the term "nozzle arrangement" is defined as comprising the nozzle itself, a nozzle lance and any tubing downstream of a closing valve to the individual nozzle.

The term "pressurized air or gas" is intended to encompass any gas that is suitable for the purpose and compatible with regulations etc.

Whereas the method for cleaning may be used to clean a nozzle arrangement or nozzle arrangements as a step in an overall cleaning procedure involving several parts of the plant, it is particularly advantageous to include a further step of reinserting the nozzle arrangement into the drying chamber without interrupting the operation of other nozzle arrangement(s) in the drying chamber. Furthermore, additional overall process efficiency is obtained if the feed supply is un-halted for the nozzle arrangement(s) which has/have been cleaned and reinserted into the drying chamber, substantially at the same time as the feed supply for another subset of nozzle arrangement(s) is halted to be emptied and removed for cleaning.

In case of alternative i) of the inventive method, it is advantageous if method step i) is applied for a first predetermined time period and followed by a further step of supplying the liquid at an amount corresponding to the concentration of solvent in the feed for a second predetermined time period. This measure ensures that the drying conditions in the drying chamber are maintained as constant as possible, as following the emptying in the first time period, the balance of drying air and solvent/liquid in the drying chamber is kept undisturbed in the second time period.

Preferably, the liquid of step i) is water, and the predefined pressure of the feed supply and the pressure of step i) preferably lie in the range of 100-250 bar.

In the case of alternative ii), method step ii) is advantageously carried out at at least 30 bar, preferably above 50 bar. At the limit of 16 bar, sufficient atomization takes place of the feed remaining in the nozzle arrangement following the halt of supply. At the advantageous lower limit of 30 bar, the emptying takes place substantially without "sputtering" at the nozzle outlet.

In alternative iii), method step iii) is advantageously carried out at an underpressure in relation to the pressure in the drying chamber of at least 2.5 kPa, more preferable at at least 5 kPa and most preferable at least 10 kPa. Means for establishing such underpressure is well known in the art.

In alternative iv), method step iv) is carried out at a pressure of at least 0.5 bar, the actual pressure being selected depending on the feed-viscosity. The pressure needed to atomize the feed during emptying may e.g. be 1 or 3 or 5, or 8 or 12 bar. It is noted that the provision of the additional stream of pressurized air/gas concentrically of the feed outlet takes place only during the emptying phase while a modest pressure at the same time is applied to the nozzle arrangement to conduct the feed to the nozzle. This pressure may be the same as the pressure above mentioned for atomization, but may also differ depending on the feed properties. It will be convenient of course layout-wise if the same air/gas source can be used for both purposes. The supply-system for the additional stream may follow the teaching for the other alternatives given herein.

In an embodiment, which is particularly advantageous in larger plants, the method includes the step of providing a plurality of nozzle arrangements in a number of groups, and the said groups are cleaned sequentially one after the other.

In another aspect, a spray drying apparatus comprising: a drying chamber, an air disperser, at least one nozzle arrangement, a feed system, a feed emptying system, and a cleaning system is provided, having the characterizing feature of the feed emptying system comprises means for emptying the feed while maintaining atomization in the at least one nozzle arrangement. In this manner, complete atomization of the feed remaining in the nozzle arrangement is achieved.

In a presently preferred embodiment, the feed emptying system comprises a pump, a pressurized air/gas source and a conduit, and the spray drying apparatus at least one valve allowing switching from the feed system to the feed emptying system. This system provides a well-functioning and reliable switching from feed to emptying medium, i.e. here pressurized air or any suitable gas, to the nozzle arrangement.

In preferred developments of the above embodiment, the feed system comprises a high-pressure pump pumping liquid feed to the at least one nozzle arrangement, and the spray drying apparatus further comprises a valve to allow passage of either feed or pressurized air/gas, and the feed emptying system comprises a one-way valve, a drain valve, a check valve and a further valve for providing the switch to pressurized air/gas.

The nozzle arrangement or nozzle arrangements in the spray drying apparatus to be cleaned with the method according to the invention may in principle include a single nozzle arrangement. However, normally at least two nozzle arrangements are present in the drying chamber, and the invention is particularly advantageous in an embodiment, in which the nozzle arrangements are provided as a plurality of nozzle arrangements in a number of groups.

In a further development of this preferred embodiment, the cleaning system is adapted to accommodate one group of nozzle arrangement(s) at the time.

Further details and advantages appear from the remaining dependent claims, and from the detailed description of preferred embodiments and examples for carrying out the method set forth below.

DETAILED DESCRIPTION OF THE INVENTION AND OF PREFERRED EMBODIMENTS

Figures 1, 2:
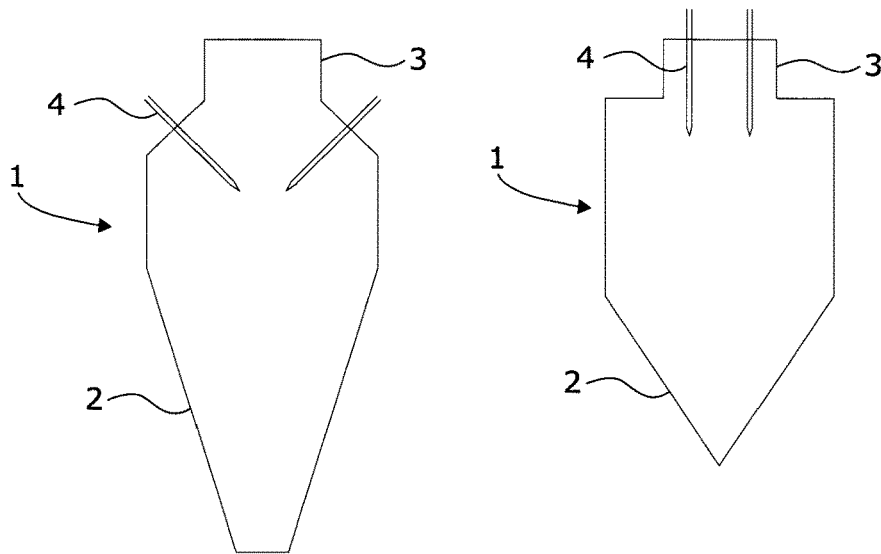
FIG. 1 shows a schematic side view of a spray drying apparatus in one embodiment of the invention.
FIG. 2 shows a schematic side view of a spray drying apparatus in a another embodiment of the invention.

In FIG. 1, an embodiment of a spray drying apparatus generally designated 1 is shown. In a manner known per se, the spray drying apparatus 1 comprises a drying chamber 2 and an air disperser 3 at the top of the drying chamber 2. Atomizer means in the form of nozzle arrangements generally designated 4 are inserted in the drying chamber 2 in a top section of the drying chamber 2 to extend at an angle relative to the vertical or height direction of the drying chamber. The nozzle arrangements 4 are indicated schematically as four nozzle arrangements 4 distributed evenly around the circumference of the upper section of the drying chamber 2. The configuration of the individual nozzle arrangements 4 will be described in further detail below.

Figures 3, 4:
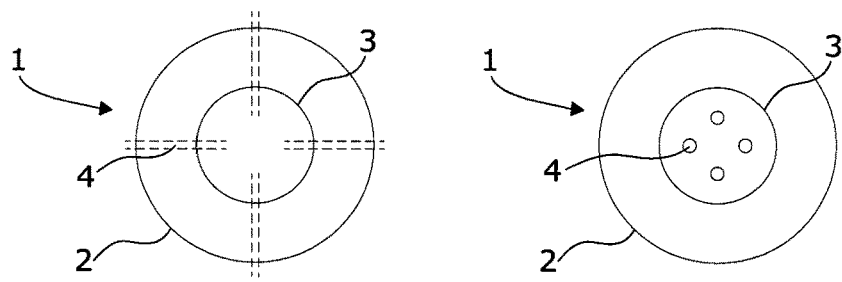
FIG. 3 is a schematic top view of the spray drying apparatus in the embodiment of FIG. 1.
FIG. 4 is a schematic top view of the spray drying apparatus in the embodiment of FIG. 2.

Correspondingly, the embodiment of FIGS. 2 and 4 comprises four nozzle arrangements 4, but positioned at the top of the air disperser 3. In general, the position and angle of the nozzle arrangements are arbitrary and are chosen such that satisfactory drying takes place. Elements having the same or analogous function will be referred to by the same reference numerals throughout the description of the various embodiments.

Figure 5:
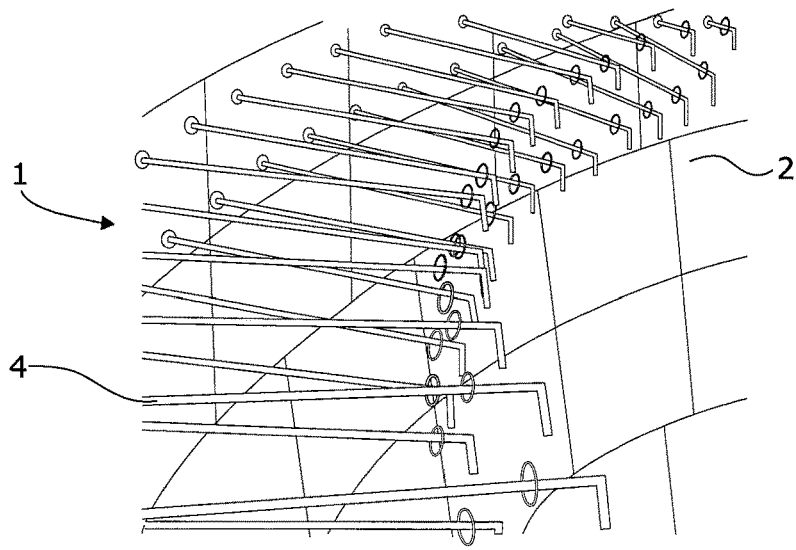
FIG. 5 shows a partial view from the inside of the drying chamber in one embodiment of the invention.

In the embodiment of FIG. 5, the nozzle arrangements 4 are positioned to extend substantially horizontally into the drying chamber 2.

Figure 6:
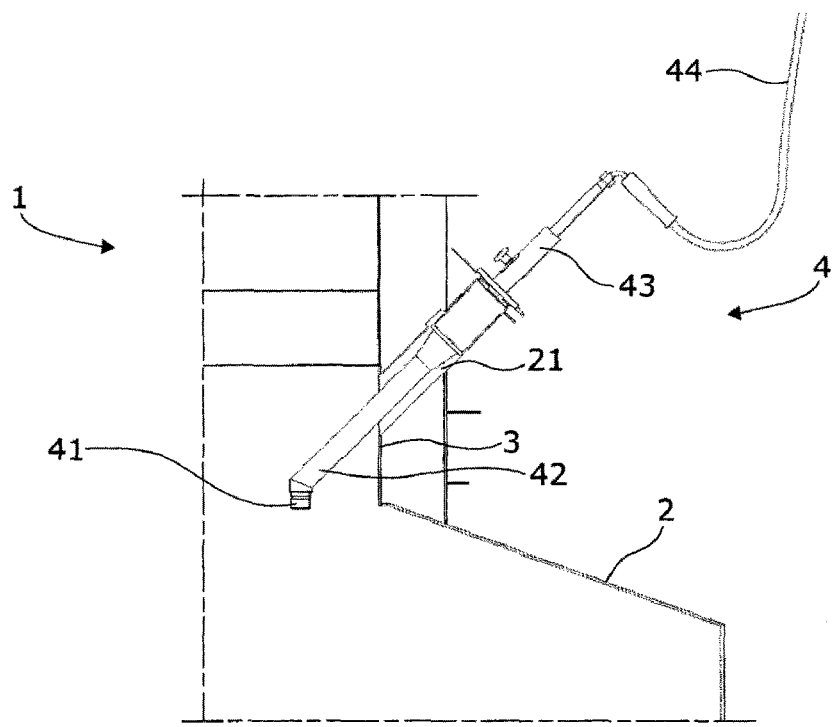
FIG. 6 shows a partial sectional view, on a larger scale, of a detail of a further embodiment of the spray drying apparatus.
Figure 7:
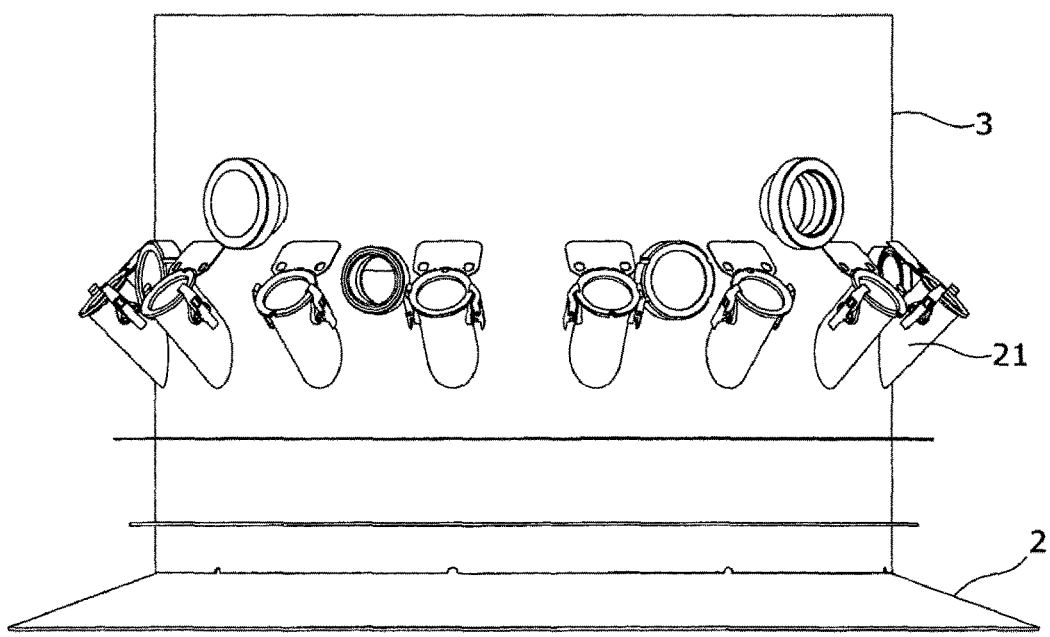
FIG. 7 is a partial side view of further details of the embodiment of FIG. 6, on a smaller scale than FIG. 6.

Referring now to FIGS. 6 and 7, which show parts of an upper section of a spray drying apparatus 1 in a further embodiment, a nozzle arrangement 4 is inserted into the drying chamber 2 through a vertical wall section of an air disperser 3 and extends at an angle relative to the vertical, here by the provision of a respective socket piece 21 connected to the air disperser 3 at the angle in question. Suitable sealing and locking means may be provided (not shown in detail). As indicated in FIG. 7, there are provisions for sixteen nozzle arrangements 4 in the spray drying apparatus in this embodiment.

Each nozzle arrangement 4 comprises a pressure nozzle 41 positioned at one end of a nozzle lance 42. At the opposite end of the nozzle lance 42, the nozzle arrangement 4 is provided with a feed inlet 43 connected to a feed system (not shown in FIGS. 6 and 7 illustrating this embodiment) for the supply of liquid feed, in the embodiment shown a supply tube 44 which again is connected via valves to an upstream piped feed system. The nozzle 41 has a feed outlet (not shown) at the end pointing towards the interior of the drying chamber 2. In the present context, the term "nozzle arrangement" is defined as comprising the nozzle itself, a nozzle lance and any tubing downstream of a closing valve to the individual nozzle. These elements are emptied and cleaned as will be described in further detail below.

The configuration of such a nozzle 41 is well-known and is for instance a commercially available pressure nozzle as provided by GEA Process Engineering A/S. Further components such as the nozzle lance 42 and accessory parts such as brackets, mounting arrangements, seals, piping etc. are standard equipment as well.

Figure 8:
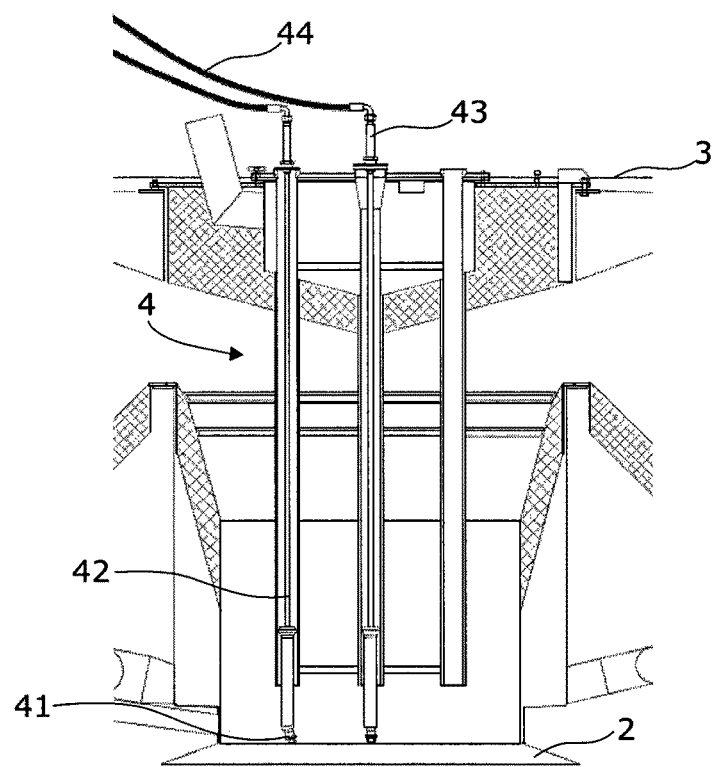
FIG. 8 shows a side view from another angle of details of a still further embodiment of the spray drying apparatus, corresponding in substance to the embodiment shown in FIG. 2.
Figure 9:
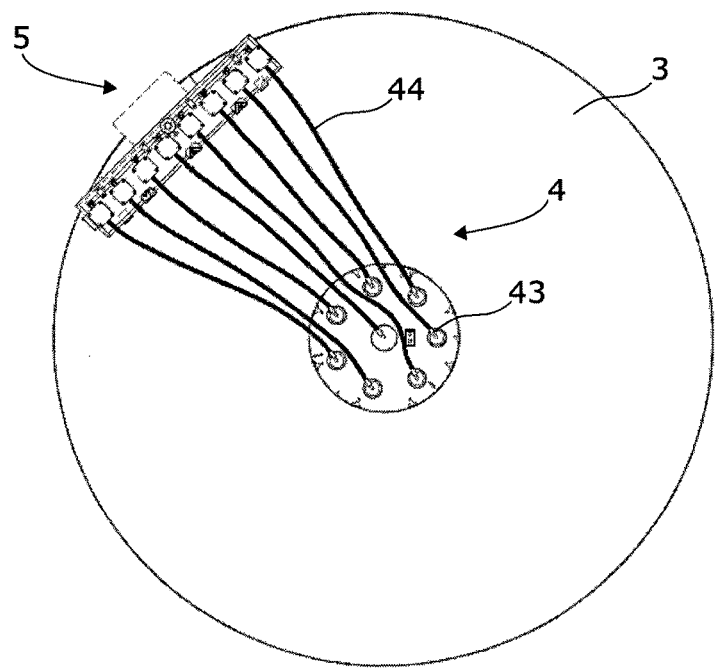
FIG. 9 shows a top view of details of the embodiment of the spray drying apparatus shown in 8.

In the still further embodiment of FIGS. 8 and 9, eight nozzle arrangements 4 are positioned in the top of an air disperser 3 and the nozzle lances 42 extend substantially vertically from the feed inlet 43 to the feed outlet at the nozzle 41 in the drying chamber 2. As shown in FIG. 9, feed supply tubes 44 are connected to a feed system generally designated 5 of the spray drying apparatus.

The spray drying apparatus of the above embodiments are shown with four, sixteen and eight nozzle arrangements 4, respectively. The nozzle arrangements may in principle be positioned in any configuration and are typically arranged in groups of for instance 4-12 nozzle arrangements. The groups of nozzle arrangements may then be removed one after the other from the drying chamber in order to be cleaned.

Figure 10:
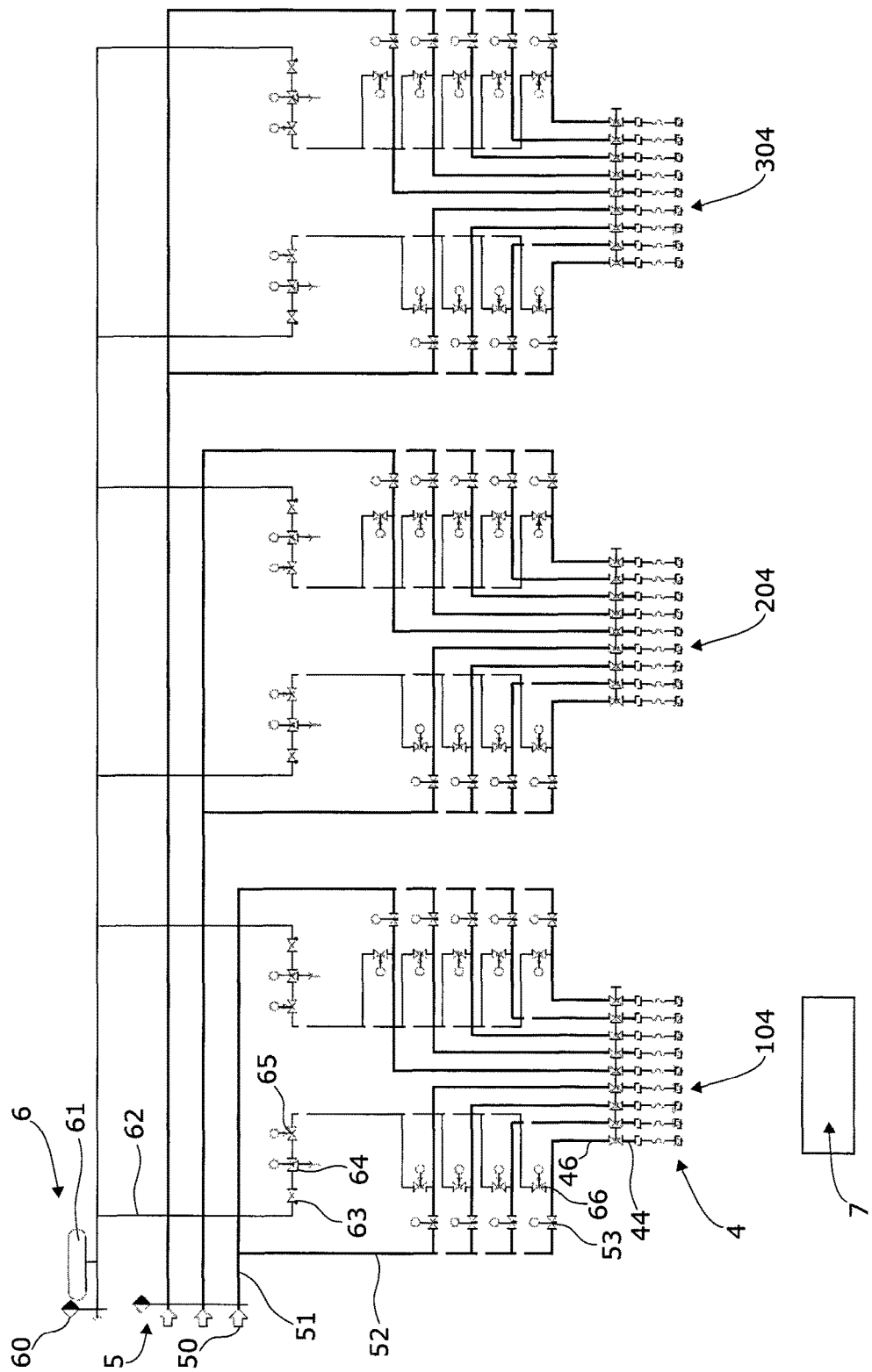
FIG. 10 is a flow diagram indicating details of a spray drying apparatus feed-system in yet another embodiment of the invention.

FIG. 10 shows a flow diagram indicating details of a configuration of a feed system 5 of a spray drying apparatus in yet another embodiment of the invention. Here, the nozzle arrangements are arranged in three groups 104, 204, 304, each group comprising nine nozzle arrangements 4. Only one group 104 of nozzle arrangements 4 will be described in further detail. Furthermore, a cleaning system generally designated 7 is shown in FIG. 10.

The feed system 5 comprises a high-pressure pump 50 pumping the liquid feed from a not-shown supply. The pump 50 pumps the liquid feed through main feed conduit 51 and further through branch feed conduit 52 to a sub-group of four nozzle arrangements 4, to the left in FIG. 10, of group 104, the remaining feed from the main feed conduit 52 supplying the other subgroup of five nozzle arrangements 4, to the right in FIG. 10, of group 104. A valve 53 provides the possibility of turning the feed supply off and on near the nozzle arrangements 4. A further valve 45 is provided at the upstream end of supply tube 44, to allow passage through conduit 46 of either feed or an emptying medium, in the embodiment shown in FIG. 10 pressurized air or any suitable gas, as will be described in further detail below.

A feed emptying system 6 is provided to maintain atomization during the emptying of the feed. The feed emptying system comprises a pump 60, a pressurized air source 61, a branch conduit 62, one-way valve 63, drain valve 64 and check valve 65. A further valve 66 makes it possible to switch the fluid entering conduit 46 from feed to pressurized air, or any other gas suitable for the purpose.

During operation of a spray drying apparatus in any of the above embodiments, liquid feed to be atomized is supplied from feed system 5 via the feed supply tubes 44 to the nozzle arrangements 4. The feed enters the drying chamber 2 from the feed inlet 43, via the nozzle lance 42 and the feed outlet at the nozzle 41.

When the individual nozzle arrangement 4, or the group 104, 204, 304 of nozzle arrangements 4, is to be cleaned in the cleaning system, either as a cleaning step in a cleaning programme during operation, or in order to provide a feed change-over, from one feed-line to another, the following procedure is initiated:

First, the feed supply is halted for the nozzle arrangement or nozzle arrangements to be cleaned. The cleaning is normally carried out during operation of the plant including the spray drying apparatus. Either individual nozzles are removed, or an entire group of nozzle arrangements, while the operation of the spray drying apparatus is continued with atomization through the remaining nozzle arrangement(s) present in the drying chamber. The nozzle arrangement is cleaned in the cleaning system of the spray drying apparatus.

After the feed supply is halted and before the at least one nozzle arrangement is removed from the drying chamber, the nozzle arrangement is emptied for feed by a method step, which is to be chosen from one of the below alternatives:

i) supplying a liquid at substantially the same pressure as the predefined pressure of the feed supply to the feed inlet of the nozzle arrangement, ii) supplying pressurized air or gas at a pressure of at least 16 bar to the feed inlet of the nozzle arrangement, iii) applying a suction from the feed inlet of the nozzle arrangement, and iv) applying an additional stream of pressurized air or gas concentrically of the feed outlet of the pressure nozzle arrangement.

Referring to FIG. 10, an emptying procedure according to step ii) is illustrated.

It is noted that pressure values are referred to in "bar", "kPa" and "MPa" as commonly used by the person skilled in the art, and conversion of values lies within the skill.

Following the emptying, removal and cleaning of the nozzle arrangements of one group 104, this group may be reinserted into the drying chamber during continued operation of the remaining group, and a corresponding procedure may be carried out on another group 204 or 304. This may be carried out according to a pre-programmed schedule for sequentially cleaning the groups one after the other.

EXAMPLE

A liquid feed of whole milk was atomized by a pressure nozzle arrangement. The nozzle arrangement was emptied for feed by method step ii) at differing pressures as listed in the below Table 1. The result was evaluated visually. The liquid feed had a viscosity of 48 cP and a solid content of 47.3%.

The result varied on the pressure utilized.

A pressure of 10 bar did not provide atomization.

A pressure of 16 bar provides atomization, however slightly uneven.

A pressure of 30 bar provides satisfactory atomization. A slight sputter from the nozzle was observed towards the end of the emptying procedure.

A pressure of 50-75 bar provides satisfactory atomization. Virtually no sputter from the nozzle was observed towards the end of the emptying procedure.

TABLE 1

| Pressure [bar] | Atomization | Sputter |
|---|---|---|
| 75 | Yes | No |
| 50 | Yes | No |
| 30 | Yes | No |
| 16 | Yes | Yes |
| 10 | No | N/A |
| 8 | No | N/A |

The invention should not be regarded as being limited to the embodiments shown and described in the above. Several modifications and combinations are conceivable within the scope of the appended claims.

The invention claimed is:

1. A method for cleaning a nozzle arrangement of a spray drying apparatus during operation, the method comprising:

providing a spray drying apparatus with a drying chamber;

providing at least one pressure nozzle arrangement inserted into the drying chamber and having a feed inlet and a feed outlet;

providing a feed conduit for supplying liquid feed to the feed inlet of each nozzle arrangement at a predefined pressure for atomization of the liquid feed;

providing a cleaning system configured to clean the at least one nozzle arrangement;

halting the feed supply for the at least one nozzle arrangement to be cleaned during operation;

removing the at least one nozzle arrangement from the drying chamber; and cleaning the at least one nozzle arrangement in the cleaning system, wherein after the feed supply is halted and before the at least one nozzle arrangement is removed from the drying chamber, the at least one nozzle arrangement is emptied for feed via one or more of:

supplying a liquid at substantially the same pressure as the predefined pressure of the feed supply to the feed inlet of the at least one nozzle arrangement, supplying pressurized air or gas at a pressure of at least 16 bar to the feed inlet of the at least one nozzle arrangement, applying suction from the feed inlet of the at least one nozzle arrangement, or applying an additional stream of pressurized air or gas concentric to the feed outlet of the at least one nozzle arrangement.

2. The method of claim 1, the method further comprising: reinserting the at least one nozzle arrangement into the drying chamber without interrupting the operation of at least one other nozzle arrangement in the drying chamber.

3. The method of claim 2, wherein the feed supply is un-halted for the at least one nozzle arrangement which has been cleaned and reinserted into the drying chamber, substantially at the same time as the feed supply for another subset of nozzle arrangement is halted to be emptied and removed for cleaning.

4. The method of claim 1, wherein the at least one nozzle arrangement is emptied for feed via supplying the liquid at substantially the same pressure as the predefined pressure of the feed supply to the feed inlet of the at least one nozzle arrangement for a first predetermined time period, and after the at least one nozzle arrangement is emptied for feed the liquid is further supplied at an amount corresponding to a concentration of solvent in the feed for a second predetermined time period.

5. The method of claim 1, wherein the at least one nozzle arrangement is emptied for feed via supplying the liquid at substantially the same pressure as the predefined pressure of the feed supply to the feed inlet of the at least one nozzle arrangement, and the liquid comprises water.

6. The method of claim 1, wherein the predefined pressure of the feed supply and an actual feed supply pressure are in the range of 100-250 bar.

7. The method of claim 1, wherein the at least one nozzle arrangement is emptied for feed via supplying the pressurized air or gas at a pressure of at least 30 bar.

8. The method of claim 1, wherein the at least one nozzle arrangement is emptied for feed via applying suction from the feed inlet of the at least one nozzle arrangement, and the suction is performed at an underpressure in relation to the pressure in the drying chamber of at least 2.5 kPa.

9. The method of claim 1, wherein the at least one nozzle arrangement is emptied for feed via applying the additional stream of pressurized air or gas concentric to the feed outlet of the at least one nozzle arrangement at a pressure of at least 0.5 bar.

10. The method of claim 1, wherein a same air/gas source is supplying the nozzle arrangement feed inlet and the additional stream of pressurized air/gas concentric to the feed outlet.

11. The method of claim 1, wherein a plurality of nozzle arrangements are provided in a number of groups, and said groups are cleaned sequentially.

* * * * *